United States Patent
Shin

(10) Patent No.: US 10,404,207 B2
(45) Date of Patent: Sep. 3, 2019

(54) ALTITUDE AND AZIMUTH ANGLE CONCURRENT DRIVING TYPE SOLAR TRACKING APPARATUS

(71) Applicant: HAEDAM CO., LTD., Busan (KR)

(72) Inventor: Hee-sung Shin, Busan (KR)

(73) Assignee: HAEDAM CO., LTD. (KR)

( * ) Notice: Subject to any disclaimer, the term of this patent is extended or adjusted under 35 U.S.C. 154(b) by 2 days.

(21) Appl. No.: 15/814,519

(22) Filed: Nov. 16, 2017

(65) Prior Publication Data

US 2019/0097572 A1    Mar. 28, 2019

(30) Foreign Application Priority Data

Sep. 25, 2017   (KR) ........................ 10-2017-0123703

(51) Int. Cl.
| | |
|---|---|
| H01L 31/042 | (2014.01) |
| H02N 6/00 | (2006.01) |
| H02S 20/32 | (2014.01) |
| F24S 50/20 | (2018.01) |
| F24S 30/455 | (2018.01) |
| F24S 30/00 | (2018.01) |

(52) U.S. Cl.
CPC ............ *H02S 20/32* (2014.12); *F24S 30/455* (2018.05); *F24S 50/20* (2018.05); *F24S 2030/11* (2018.05); *F24S 2030/134* (2018.05); *F24S 2030/137* (2018.05); *F24S 2030/16* (2018.05)

(58) Field of Classification Search
CPC .......... H02S 20/32; F24S 30/455; F24S 50/20
See application file for complete search history.

(56) References Cited

FOREIGN PATENT DOCUMENTS

| KR | 10-2010-0096945 A | 9/2010 |
|---|---|---|
| KR | 10-2011-0112047 A | 10/2011 |

OTHER PUBLICATIONS

Korean Decision to Grant (KR 10-2017-0123703), KIPO, dated Feb. 21, 2019.

*Primary Examiner* — Angelo Trivisonno
(74) *Attorney, Agent, or Firm* — Park & Associates IP Law, P.C.

(57) ABSTRACT

An altitude and azimuth angle concurrent driving type solar tracking apparatus, which includes: a worm receiving rotational power through a first end and coupled to a central shaft in a casing; an altitude actuator engaged with the worm; an azimuth actuator engaged with the worm; a diurnal motion control frame composed of a first azimuth link arm and a second azimuth link arm; a meridian altitude angle control frame composed of a first altitude link arm, a second altitude link arm, and an altitude actuating arm; and a solar panel mount coupled to a second end of the second azimuth link arm. The apparatus simultaneously tracks the altitude angle and the azimuth angle of the sun using rotational power transmitted through the first end of the worm and maintains the base of a solar panel parallel to the ground when tracking the sun.

6 Claims, 6 Drawing Sheets

ALTITUDE AND AZIMUTH ANGLE CONCURRENT DRIVING TYPE SOLAR TRACKING APPARATUS

REFERENCE TO RELATED APPLICATIONS

This application claims the priority benefit of Korean Patent Application No. 10-2017-0123703 filed on Sep. 25, 2017, the entire contents of which are incorporated herein by reference.

FIELD OF THE INVENTION

The present invention relates to a solar tracking apparatus and, more particularly, to a solar tracking apparatus that simultaneously tracks an azimuth angle and an altitude angle according to the diurnal motion of the sun using one power supply and automatically tracks a difference in annual meridian altitude of the sun.

BACKGROUND OF THE INVENTION

A solar tracking apparatus, which follows the sun from sunrise to sunset, is used by solar power systems.

When the closer to the right angle the incident angle of the sunlight reaching a solar panel is, the higher power generation efficiency the solar power generation can be, thus a solar tracking system is generally used to improve the power generation efficiency by driving the solar panel to always follow the sun.

The altitude and the azimuth angle of the sun change with the diurnal time and the seasons, and many apparatuses are developed for tracking the sun regardless of time and seasons.

The methods of tracking the sun can be largely classified into program type tracking, sensor type tracking, and program-sensor type tracking. The program type tracking, which is a method of tracking the sun by calculating the altitude angle and the azimuth angle of the sun from the orbit of the sun, has relatively high accuracy. The sensor type tracking, which is a method of determining the location of the sun using an optical sensor, such as a DCS sensor that senses the amount of sunlight, uses only the value read by the CDS sensor, so the controller specifications are simple and accordingly this method can be implemented at low costs. The sensor-program type tracking uses only the advantages of the program type and the sensor type and supplements the disadvantages of the types, so it is used for system designed to more accurately track the sun.

Meanwhile, since the altitude and the azimuth angle of the sun are simultaneously changed, a method that supplies power to two driving shafts and precisely controls the driving shafts using a program or a sensor in order to track the diurnal motion of the sun is commonly used.

In order to improve the two-shaft driving type, there are Korean Patent Nos. 10-1031286, 10-1017083, and 10-1492585, which simultaneously track the azimuth angle and the altitude angle of the sun using a cam or gear engagement.

The apparatuses for tracking the sun in the related art require a weight to keep the balance of solar panels in many cases and there is a possibility of breakage due to complicated structures. Further, in the types of driving two shafts using one power supply, the base of the solar panel is inclined when the solar panel is moved to follow the altitude angle and the azimuth angle of the sun, so it is difficult to operate and maintain the apparatuses.

The foregoing is intended merely to aid in the understanding of the background of the present invention, and is not intended to mean that the present invention falls within the purview of the related art that is already known to those skilled in the art.

SUMMARY OF THE INVENTION

The present invention has been made in an effort to solve the problems in the related art and an object of the present invention is to provide an altitude and azimuth angle concurrent driving type solar tracking apparatus that has a solar panel balanced in the installation step, has a low load in daily solar tracking load, automatically tracks the annual meridian altitude of the sun, can operate a plurality of solar panels to track the sun using one power supply, and keeps the base of the solar panels parallel to the ground, thereby improving spatial utilization for a plurality of apparatuses.

In order to achieve the objects of the present invention, an altitude and azimuth angle concurrent driving type solar tracking apparatus includes: a central shaft disposed at a center in a casing and having a first end for receiving rotational power and a second end with a spur gear fitted thereon; a first azimuth rotary shaft spaced from the central shaft outside the casing, rotatably coupled to the casing through a top of the casing, having a first end having gear teeth to be engaged with the spur gear in the housing and a second end having a first yoke-shaped link coupler, and exposed outside the casing; a first azimuth link arm formed by combining two pipes in a piston type to have a variable length and having a first end linked to the first yoke-shaped link coupler to form a first azimuth link joint and a second end having a second yoke-shaped link coupler; a second azimuth link arm having a first end coupled to the second yoke-shaped link coupler to form a second azimuth link joint and a second end coupled to a solar panel mount for fastening a solar panel; a second azimuth rotary shaft coupled to the second end of the second azimuth link arm to be perpendicular to the longitudinal direction of the second azimuth link arm; a rotary shaft housing coupled to the second azimuth rotary shaft and inclined such that a rotational plane formed by the second azimuth link arm tracks a diurnal motion plane of the sun; and a meridian altitude control frame disposed opposite to the first azimuth rotary shaft with the central shaft therebetween outside the casing and mounting the rotary shaft housing, in which when rotation of the central shaft is transmitted to the first azimuth link arm, the solar panel tracks the altitude angle and the azimuth angle of the sun by rotational inclination of the second azimuth link arm.

The meridian altitude angle control frame may include: an altitude actuator including a worm gear engaged with a worm formed on the central shaft, rotating 360°/365 per a daily altitude angle-tracking rotation amount of the worm in the casing, combined with a one-direction clutch to rotate in only one direction, a vertical moving rod disposed opposite to the first azimuth rotary shaft with the central shaft therebetween outside the casing and coupled to the casing to vertically move, and a connecting rod crank-connecting the worm gear and the vertical moving rod to each other; a first altitude link arm having a first end linked to the central shaft outside the casing to form a first fixed link and a second end having a second altitude link joint; a second altitude link arm having a first end linked to the second altitude link joint and a second end having the rotary shaft housing; and an altitude actuating arm including a main arm having a first end linked between the central shaft and the vertical moving rod outside the casing to form a second fixed link and a second end linked to a body of the second altitude link arm to form a third altitude link joint, and an assistant arm extending and curving toward the vertical moving rod from the second fixed link of the main arm and linked to an end of the vertical moving rod to form an actuating link joint, in which the worm gear may vertically reciprocate the vertical moving rod one time for a year while rotating one round for a year, thereby changing an inclination angle of the rotary shaft housing to follow the variable meridian altitude of the sun.

The second azimuth link arm may include an assistant link arm extending from the first end thereof in the same direction as the second azimuth rotary shaft, and the second azimuth link joint may be formed by coupling an end of the assistant link arm to the second yoke-shaped link coupler.

The apparatus may further include: a rotary arm coupled to the first end of the central shaft; and a rotary arm actuator for the rotary arm, in which the rotary arm may be controlled by the rotary arm actuator such that the second azimuth arm rotates to follow the sun in the daytime, and is controlled to return to prepare for tracking the sun in the next day.

The apparatus may further include a power transmission shaft linked to the rotary arm between the rotary arm and the rotary arm actuator, in which the rotary arm actuator may move straight the power transmission shaft such that the central shaft is rotated by a crank motion of the power transmission shaft and the rotary arm.

A plurality of the apparatuses may be arranged in a line on the power transmission shaft and the rotary arms may be connected to simultaneously operate the apparatuses using the rotary arm actuator.

According to the present invention, there is provided an altitude and azimuth angle concurrent driving type solar tracking apparatus that has a solar panel balanced in the installation step, has a low load in daily solar tracking load, automatically tracks the annual meridian altitude of the sun, can operate a plurality of solar panels to track the sun using one power supply, and keeps the bottom of the solar panels parallel to the ground, thereby improving spatial utilization for a plurality of apparatuses.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, the present invention will be described with reference to the drawings, and in the following description of the present disclosure, well-known functions or configurations will not be described in detail when it is determined that they may make the spirit of the present disclosure unclear.

The terms described hereafter are terms defined in consideration of the functions in the present disclosure and may be change in accordance with the intention of a user and an operator, so the definition should be based on the entire description of the present disclosure.

Figure 1:
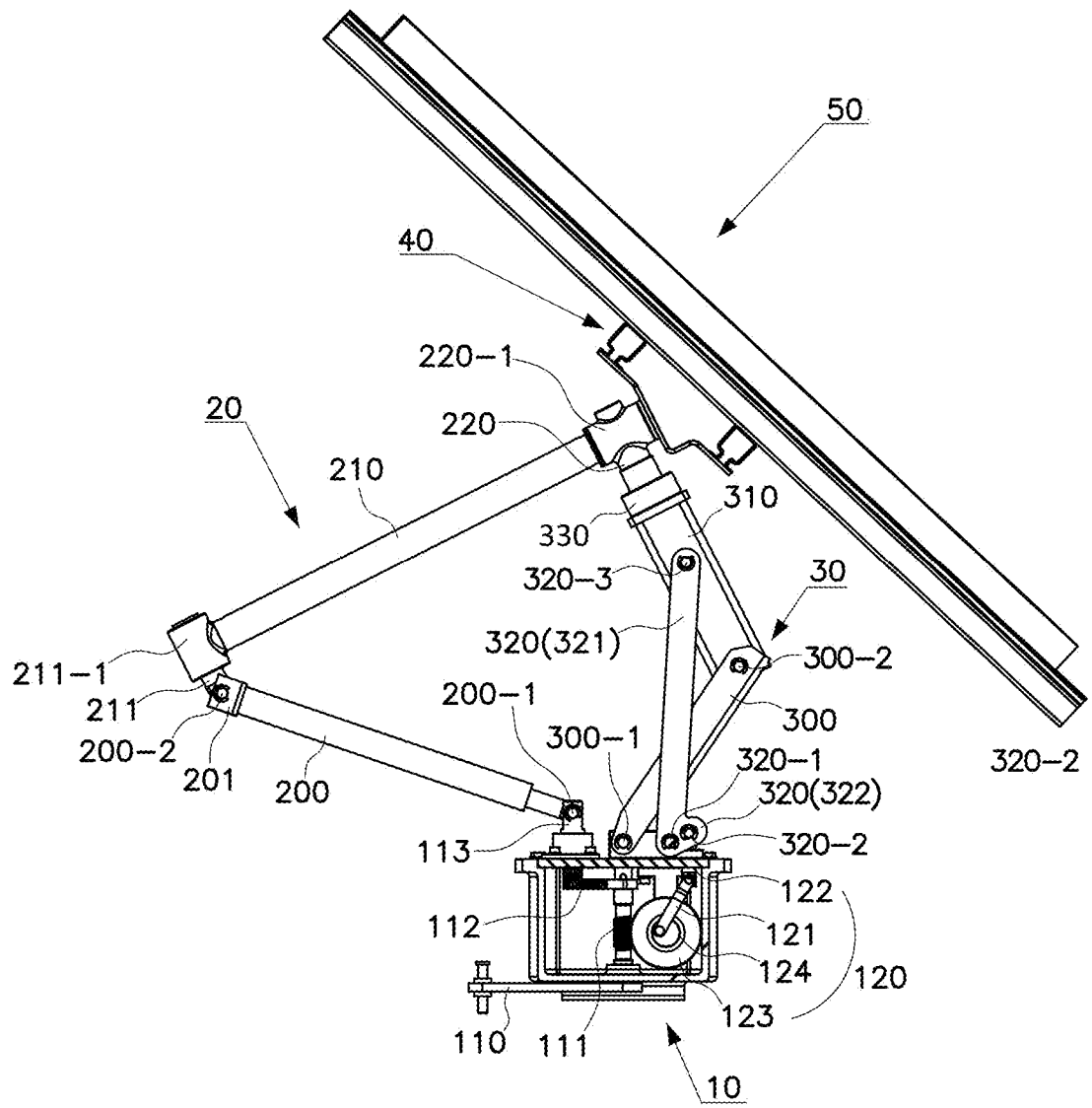
FIG. 1 is a side view of the present invention.
Figure 2:
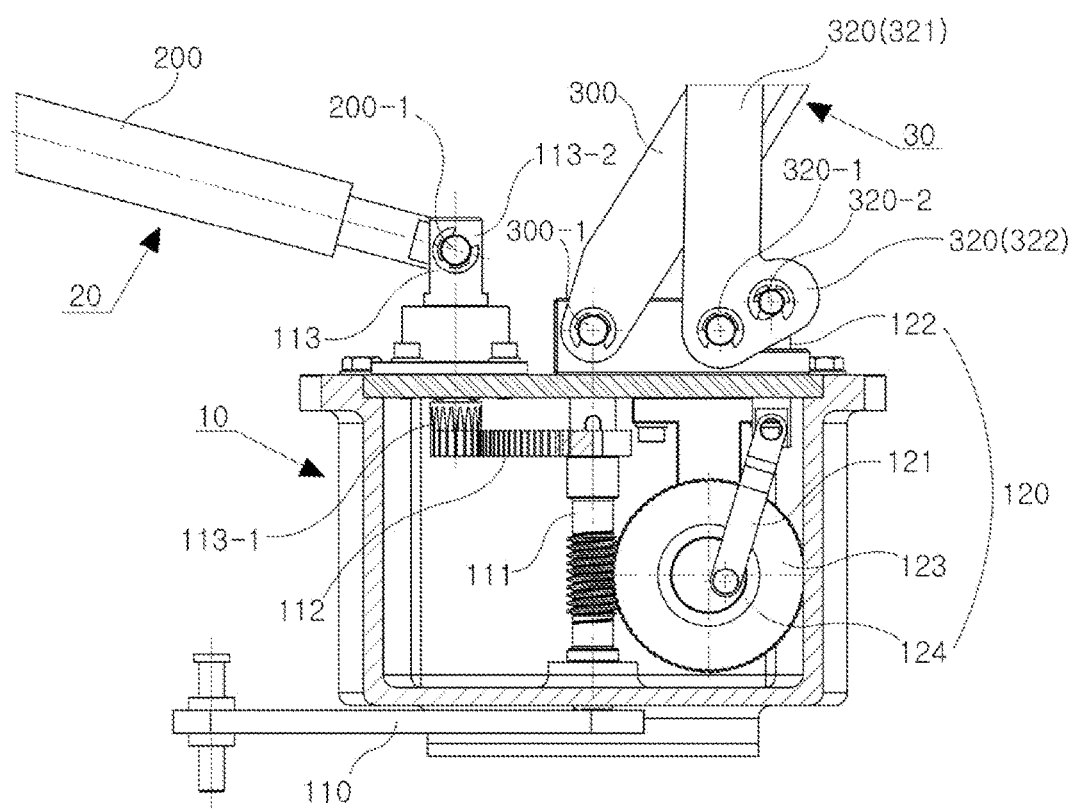
FIG. 2 is a side view showing the inside of a casing of the present invention.
Figure 3:
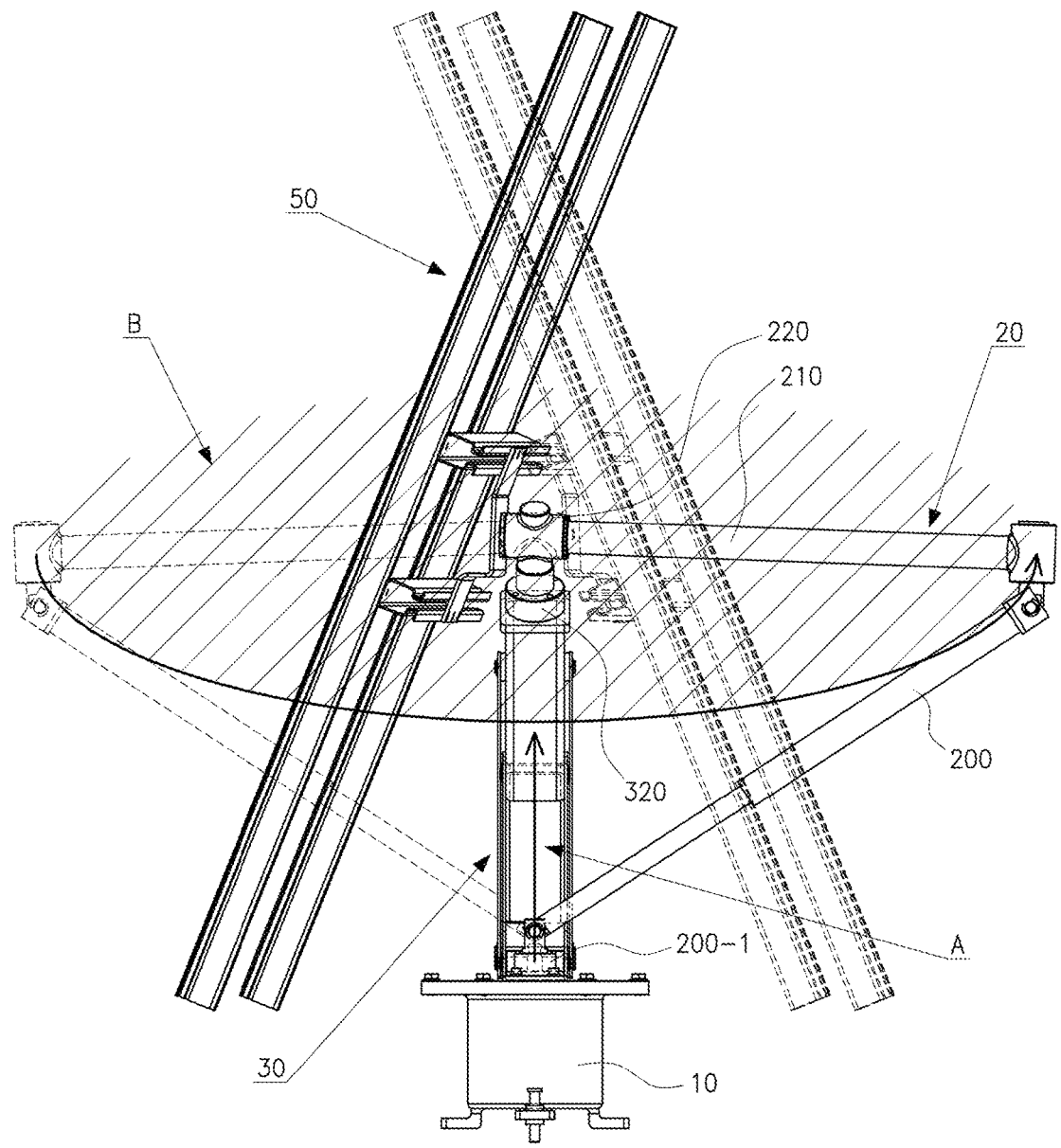
FIG. 3 is a rear view showing a daily azimuth angle-tracking path of the present invention.
Figure 4:
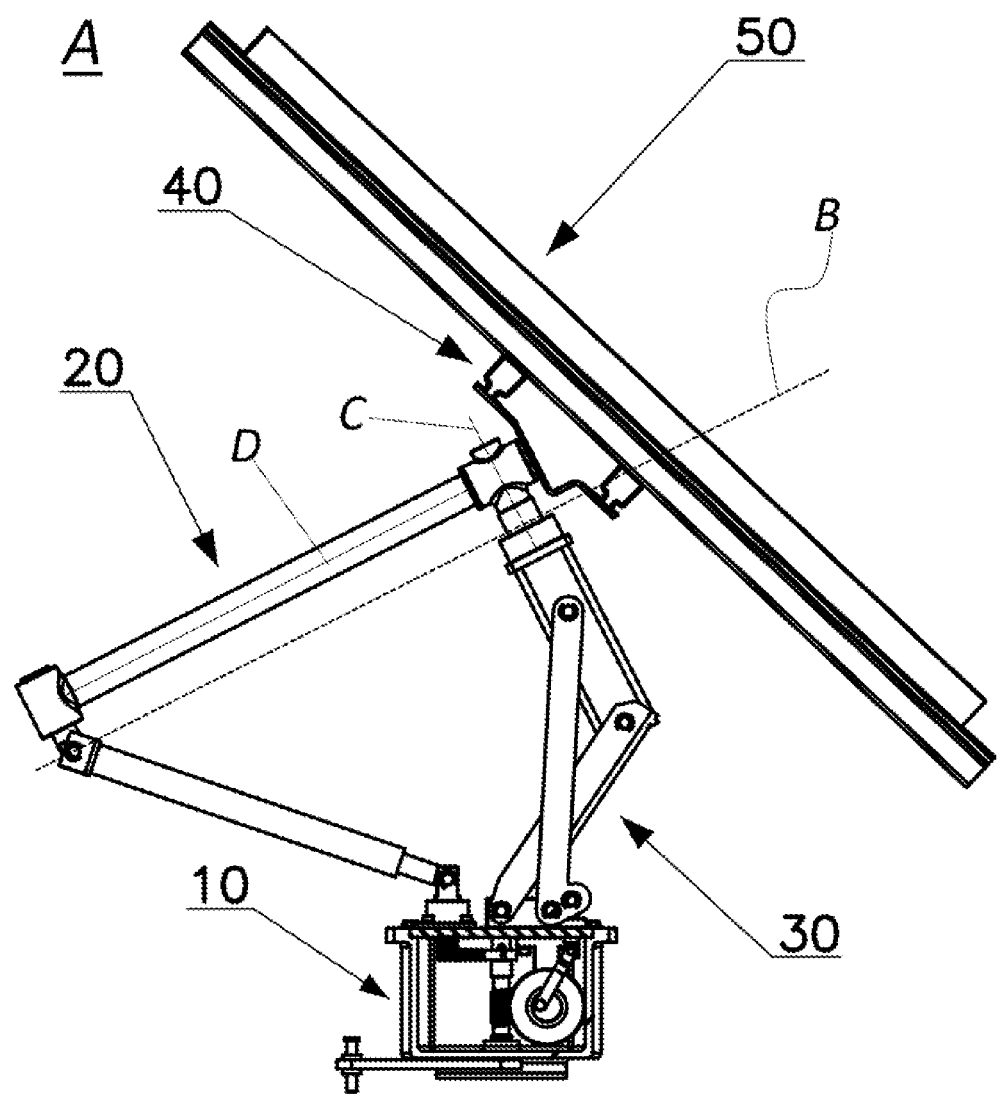
FIG. 4 is a side view showing the path of FIG. 3 when the sun culminates.
Figure 5:
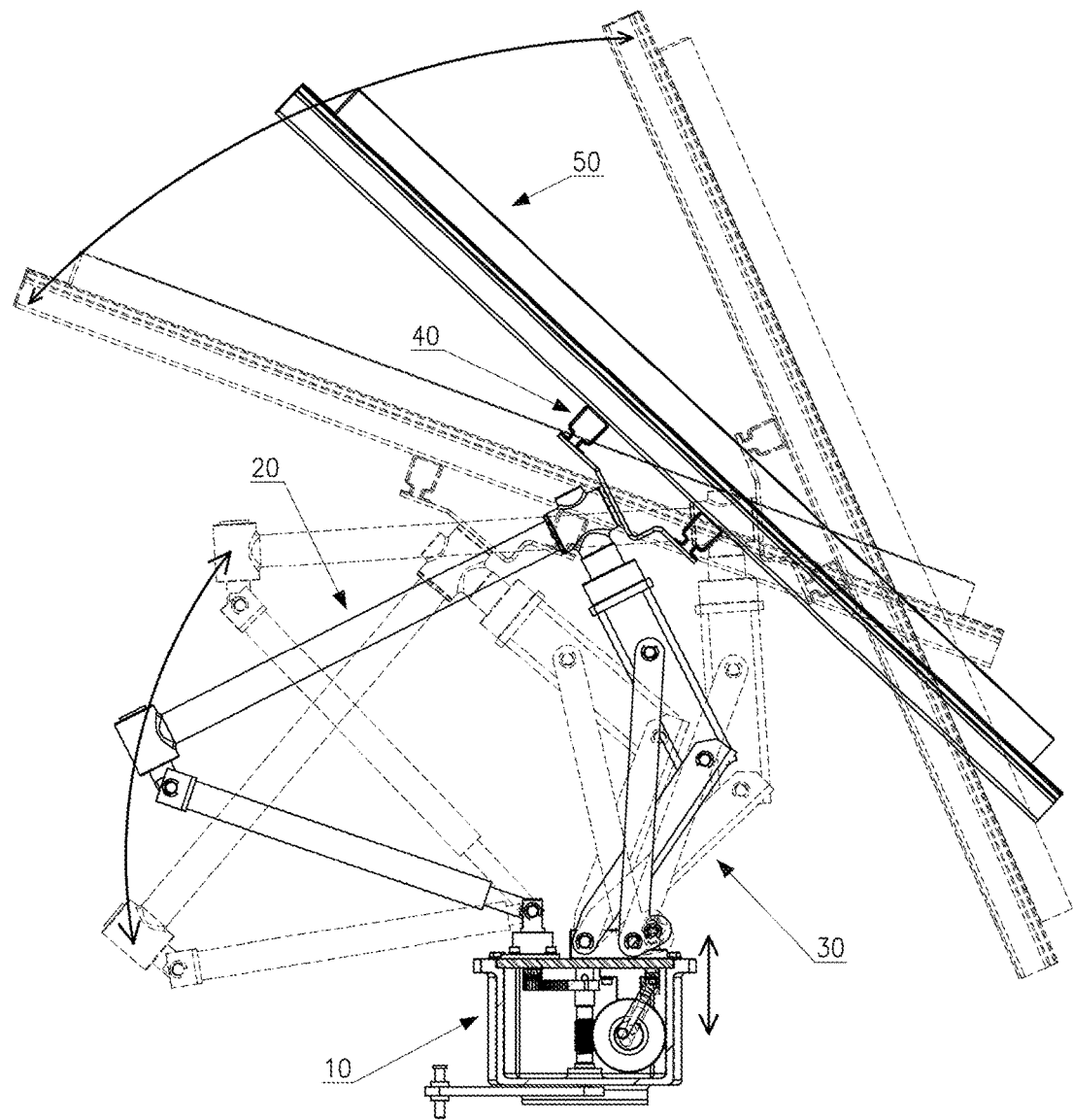
FIG. 5 is a side view showing an annual meridian altitude-tracking path of the present invention.
Figure 6:
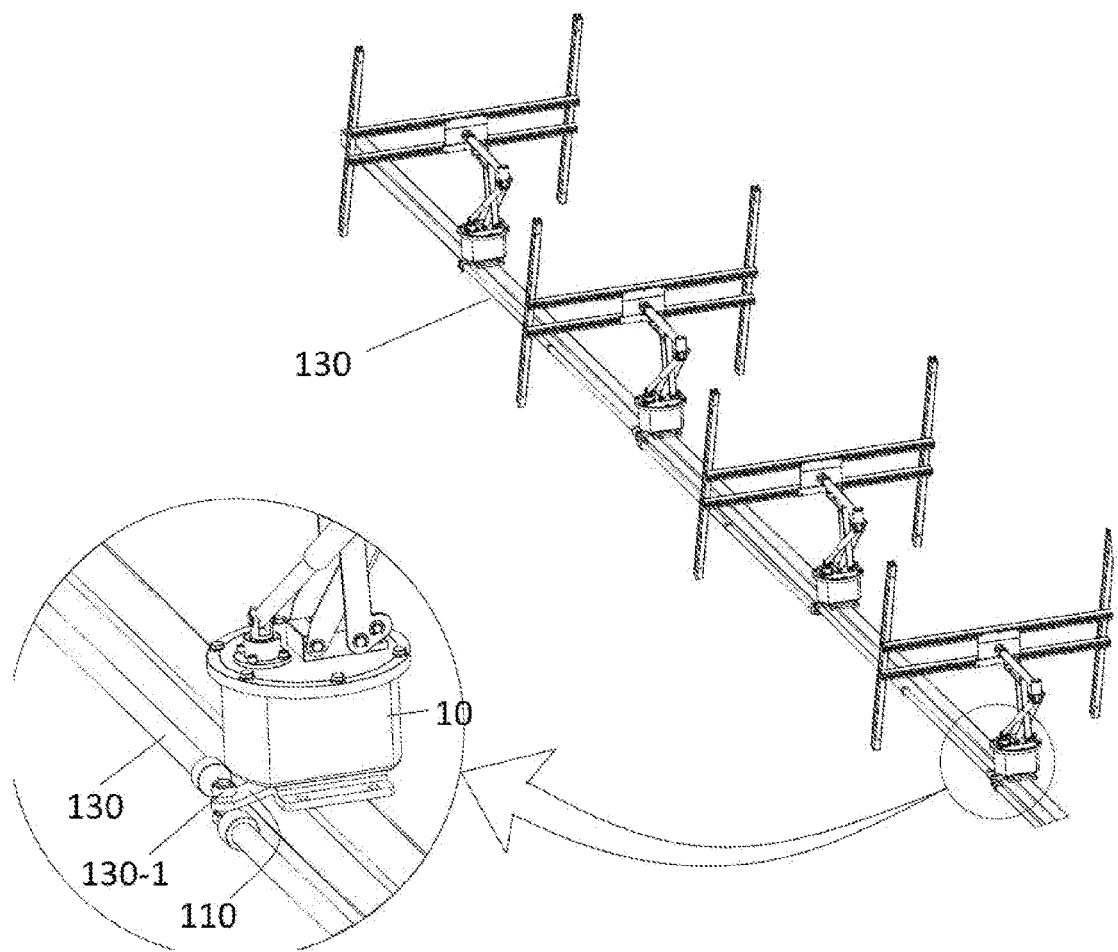
FIG. 6 is a perspective view showing an embodiment in which a plurality of apparatuses of the present invention is installed.

FIG. 1 is a side view of the present invention, FIG. 2 is a side view showing the inside of a casing of the present invention, FIG. 3 is a rear view showing a daily azimuth angle-tracking path of the present invention, FIG. 4 is a side view showing the path of FIG. 3 when the sun culminates, FIG. 5 is a side view showing an annual meridian altitude-tracking path of the present invention, FIG. 6 is a perspective view showing an embodiment in which a plurality of apparatuses of the present invention is installed.

As shown in the figures, the present invention includes: a central shaft (with worm) 111 coupled to a spur gear 112 disposed in a casing 10; an altitude actuator 120 composed of a worm gear 123, a vertical moving rod 122, and a connecting rod 121; a first azimuth rotary shaft 113 having gear teeth 113-1 and a first yoke-shaped link coupler 113-2; a first azimuth link arm 200 connected to a first azimuth link joint 200-1 and has a second yoke-shaped link coupler 202; a second azimuth link arm 210 coupled to a second azimuth link joint 200-1 and a solar panel mount 40; a second azimuth rotary shaft 220; a first altitude link arm 300 connected to a first fixed link 300-1 and a second altitude link joint 300-2; a second altitude link arm 310 having a rotary shaft housing 330; and an altitude actuating arm 320 composed of a main arm 321 connected to a second fixed link 320-1 and a third altitude link joint 320-3 and an assistant arm 322 connected to an actuating link joint 320-2.

As shown in FIG. 1, the central shaft 111 of the present invention is disposed at the center in the case 10 and has a first end for receiving rotational power and a second end engaged with the spur gear 112.

The central shaft 111 itself is enough to rotate the first azimuth rotary shaft 113 in the casing 10, but in order to operate the vertical moving rod 122 on the casing 10, a worm is formed and the worm gear 123 is engaged.

The torque rotates the central shaft (worm), so the spur gear 112 and the worm gear 123 are rotated together.

Accordingly, when a worm is formed on the central shaft 111, the rotational power for rotating the worm is divided into torque for the spur gear 112 and torque for the worm gear 123. The present invention uses the torque for the spur gear 112 as power for tracking daily altitude angle and azimuth angle and uses the torque for the work gear 123 as power for tracking the annual meridian altitude of the sun.

As described above, the operation for daily solar tracking of the present invention is performed by the torque that is sequentially transmitted to the spur gear 112 and the first azimuth rotary shaft 113.

As shown in FIG. 1, the spur gear 112 is fitted on the second end of the central shaft (worm) 111 in the casing 10, thereby transmitting rotational power supplied to the first end.

The first azimuth rotary shaft 113, which is a bar rotatably coupled to the casing 10, is spaced from the central shaft 111 outside the casing 10.

The first azimuth rotary shaft 113 is disposed through the top of the casing 10 with both ends inside and outside the casing 10, respectively. The gear teeth 113-1 is formed at a first end to be engaged with the spur gear 112 in the casing 10 and the first yoke-shaped link coupler 113-2 is formed at a second end outside the casing 10.

Rotation of the central shaft (worm) 111 is sequentially transmitted to the spur gear 112 and the first azimuth rotary shaft 113, so the first yoke-shaped link coupler 113-2 is rotated.

Rotation of the first azimuth rotary shaft 113 is used to track the altitude angle and the azimuth angle of the sun from sunrise to sunset, so a daily rotational angle has only to satisfy the change in solar altitude angle without performing one revolution.

Accordingly, the rotational angle of the central shaft (worm) 1111 and the engagement of the spur gear 112 and the first azimuth rotary shaft 113 can be determined in consideration this purpose.

According to the present invention, tracking the solar azimuth angle is performed by a diurnal motion control frame 20 that converts torque from the first azimuth rotary shaft 113 into a rotational motion of a solar panel. The diurnal motion control frame 20 is, as shown in FIG. 1, composed of the first azimuth link arm 200 and the second azimuth link arm 210 that are linked to each other.

The first azimuth link arm 200, which is a bar formed by two pipes combined in a piston type to be able to change the length, has a first end coupled to the first yoke-shaped link coupler 113-2 to form the first azimuth link joint 200-1 and a second end where the second yoke-shaped link coupler 201 linked to the second azimuth link arm 210 is formed.

The second azimuth link arm 210, which is a straight frame, has a first end linked to the second yoke-shaped link coupler 201 to form the second azimuth link joint 200-2 and a second end coupled to the solar panel mount 40 for fastening a solar panel 50. Further, the second azimuth rotary shaft 220 is coupled to the second end to be perpendicular to the longitudinal direction.

In an embodiment of the present invention, a second arm sleeve 220-1 having the second azimuth rotary shaft 220 is coupled to the first end of the second azimuth link arm 210 and a first arm sleeve 211-1 having the assistant link arm 211 is coupled to the second end of the second azimuth link arm 210 to make assemblage convenient.

The second azimuth rotary shaft 220 and the assistant link arm 211, as shown in FIG. 1, may be arranged in the same direction.

The rotary shaft housing 330 of the present invention is a part to which the second azimuth rotary shaft 220, and as show in FIG. 3, is inclined such that the rotational plane of the second azimuth link arm 210 tracks the diurnal motion plane of the sun.

The rotary shaft housing 330 is mounted on the casing 10 through a meridian altitude angle control frame 30.

The meridian altitude angle control frame 30, as shown in FIGS. 1 and 2, is disposed opposite to the first azimuth rotary shaft 113 with the central shaft 111 therebetween outside the casing 10 and has the rotary shaft housing 330 inclined with respect to the ground at an end thereof.

The solar panel mount 40 of the present invention is formed at the second end of the second azimuth link arm 210, and as shown in FIG. 3, the direction thereof depends on rotation of the second azimuth link arm 210.

According to this configuration, the first azimuth link arm 200 is yoke-linked to the first azimuth rotary shaft 113 to form a rotational plane that is limited by the rotational angle of the first azimuth rotary shaft 113. The second azimuth link arm 210 receives torque from the first azimuth link arm 200, but is restricted by the second yoke-shaped link coupler 201 and is not revolved on its axis.

The rotation of the second azimuth link arm 210 is, as shown in FIG. 4, restricted by the coupling angle B of the second azimuth rotary shaft 220 and the rotary shaft housing 330, thereby forming the inclined rotational plane, as shown in FIG. 3.

The second azimuth link joint 200-2 on the second azimuth link arm 210 and the second azimuth link joint 200-2 on the first azimuth link arm 200 cannot be matched due to the inter-axial distance and the inclinations of the first azimuth rotary shaft 113 and the second azimuth rotary shaft 220, but this non-matching is removed by the variable length of the first azimuth link arm 200, so the second azimuth link joint 200-2 maintains connection between the first azimuth link arm 200 and the second azimuth link arm 210.

The first azimuth link arm 200 is stretched at sunrise and sunset, as shown in FIG. 3, and contracted at a meridian altitude angle A, as shown in FIG. 2, thereby removing the non-matching.

Accordingly, the first azimuth link arm 200 forms a rotational plane while changing the length and the second azimuth link arm 210 forms an inclined rotational plane around the second azimuth rotary shaft 220 by being rotated by torque from the first azimuth link arm 200.

As show in FIG. 3, the inclination angle of the rotary shaft housing 330 can be set such that the second azimuth link arm 210 is rotated to have the same rotational plane as the diurnal motion plane of the sun at the vernal equinox and the autumnal equinox.

According to this configuration, the solar panel 50 coupled to the second end of the second azimuth link arm 210 simultaneously tracks the altitude angle and the azimuth angle of the sun by rotating the second azimuth link arm 210 around the second azimuth rotary shaft 220 from sunrise to sunset.

In this process, since the second azimuth link arm 210 is restricted and cannot be revolved on its axis D by the second yoke-shaped link coupler 210, the solar panel 50 coupled to the second end of the second azimuth link arm 210 tracks the altitude angle and the azimuth angle while maintaining the initial state (parallel to the ground if it is initially installed with the base parallel to the ground).

The meridian altitude angle control frame 30 is composed of the altitude actuator 120, the first altitude link arm 300, the second altitude link arm 310, and the altitude actuating arm 320.

The altitude actuator 120 is composed of the worm gear 123, the vertical moving rod 122, and the connecting rod 121. The vertical moving rod 122, which is a rod coupled to the casing 10 to vertically move, is spaced apart from the central shaft 111 outside the casing 10.

The vertical moving rod 122 and the worm gear 123 are crank-connected through the connecting rod 121, so a rotational motion of the worm gear 123 is converted into vertical reciprocation of the vertical moving rod 122.

Accordingly, the torque transmitted to the worm gear 123 from the worm rotated by rotational power is converted into the force for vertically moving the vertical moving rod 122 through the connecting rod 121.

The worm and worm gear 123 are engaged to rotate 360°/365 per daily azimuth angle-tracking rotation amount of the worm and a one-direction clutch 124 is fitted on the rotary shaft of the worm gear 123 to rotate the worm gear 123 only in one direction.

Accordingly, while the worm tracks the solar altitude angle for a day, the worm gear 123 rotates 360°/365, but when the worm is rotated to be returned, the worm gear 123 is not rotated.

Accordingly, the worm gear 123 rotates a round for a year and the vertical moving rod 122 vertically reciprocates one time for a year.

A first end of the first altitude link arm 300 is linked to the central shaft 111 outside the casing 10 to form the first fixed link 300-1 and a second altitude link joint 300-2 is formed at the second end of the first altitude link arm 300. A first end of the second altitude link arm 310 is linked to the second altitude link joint 300-2 and the rotary shaft housing 330 is formed at a second end of the second altitude link arm 310.

The altitude actuating arm 320 is divided into the main arm 321 and the assistant arm 322 extending and curving from an end of the main arm 321. The main arm 311 has a first end linked between the central shaft 111 and the vertical moving rod 122 outside the casing 10 to form the second fixed link 320-1 and a second end linked to the body of the second altitude link arm 310 to form the third altitude link joint 320-3.

The assistant arm 322 extends and curves toward the vertical moving rod 122 from the second fixed link 320-1 and is liked to an end of the vertical moving rod 122 to form the actuating link joint 320-2.

Accordingly, the coupling relationships among the first altitude link arm 300, the second altitude link arm 320, and the actuating link arm 320 changes the coupling angle between the first altitude link arm 300 and the second altitude link arm 310 in accordance with the displacement of the actuating link joint 320-2, so the inclination angle of the rotary shaft housing 330 formed at the second end of the second altitude link arm 310 is changed.

Since the actuating link joint 320-2 is linked to the vertical moving rod 122, the inclination angle of the rotary shaft housing 330 is changed one time for a year by the vertical moving rod 122.

The inclination angle of the rotary shaft housing 330 is the daily solar meridian altitude and the solar meridian altitude changes little by little everyday from the summer solstice to the winter solstice. Accordingly, the second azimuth link arm 210 tracks the solar meridian altitude for a year, as shown in FIG. 5, by changing everyday the inclination angle of the rotary shaft housing 330 to follow the solar meridian altitude.

Therefore, according to the present invention, there is provided an apparatus that tracks the altitude angle and the azimuth angle of the sun from sunrise to sunset through the diurnal motion control frame 20 while rotating the worm one round for a day, and tracks the annual solar meridian altitude while rotating the worm gear 123 by 360°/365 for a day.

Further, according to the present invention, as in the embodiment shown in FIG. 1, since it is possible to adjust the coupling angle between the solar panel 50 and the second azimuth link arm 210 through the solar panel mount 40, it is possible to reduce the load due to a change in altitude angle.

As described above, the rotational amount of the central shaft 111 (worm) is limited by the solar azimuth angle to be tracked, so it is required to set the gear ratio such that the daytime azimuth angle and altitude angle of the sun can be tracked.

In this case, when a rotary arm 110 is coupled to a first end of the worm and an actuator (not shown) for rotating the rotary arm 110 at a predetermined angle is provided, it is sufficient to track the daily azimuth angle and altitude angle of the sun.

Further, as shown in FIG. 6, a power transmission shaft 130 is linked to the rotary arm 110, the actuator (not shown) is installed at an end of the power transmission shaft 130, and the power transmission shaft 130 is moved straight, whereby the straight motion of the power transmission shaft 130 can be converted into a rotational motion by a crank motion.

According to this configuration, as shown in FIG. 6, a plurality of solar tracking apparatuses of the present invention may be provided and a plurality of rotary arms 110 may be connected to the power transmission shaft 130, and this case, it is possible to operate a plurality of solar tracking apparatuses only through the straight motion of the power transmission shaft 130.

Therefore, according to the present invention, as shown in FIG. 6, there is provided an apparatus that tracks the azimuth angle and the altitude angle the sun while maintaining the base of the entire solar panel connected to one power transmission shaft 130, parallel to the ground.

The drawings for illustrating the present invention show one embodiment of the present invention in detail, and as shown in the drawings, various combinations are possible to implement the present invention.

Accordingly, the present invention is not limited to the embodiment and may be modified in various ways by those skilled in the art within the scope of the present invention, and the modifications are included in the scope of the present invention.

What is claimed is:

1. A solar tracking apparatus comprising:
 a central shaft disposed in a casing and adapted to receive rotational power, and having a spur gear fitted thereon;
 a first azimuth rotary shaft spaced from the central shaft and rotatably coupled to the casing, and having a first end having gear teeth engaged with the spur gear in the housing and a second end having a first yoke-shaped link coupler;
 a first azimuth link arm having two arm members coupled to form a piston to have a variable length and having a first end linked to the first yoke-shaped link coupler to form a first azimuth link joint and a second end having a second yoke-shaped link coupler;
 a second azimuth link arm having a first end coupled to the second yoke-shaped link coupler to form a second azimuth link joint and a second end coupled to a solar panel mount for fastening a solar panel;
 a second azimuth rotary shaft coupled to the second end of the second azimuth link arm in a direction perpendicular to a longitudinal axis of the second azimuth link arm;
 a rotary shaft housing coupled to the second azimuth rotary shaft and configured to be inclined in a direction that a rotational plane formed by the second azimuth link arm tracks a diurnal motion plane of the sun; and
 a meridian altitude angle control frame disposed opposite to the first azimuth rotary shaft from the central shaft of the casing, an upper end of the meridian altitude angle control frame including the rotary shaft housing,
 wherein when rotation of the central shaft is transmitted to the first azimuth link arm, the solar panel tracks the altitude angle and the azimuth angle of the sun by rotational inclination of the second azimuth link arm.

2. The apparatus of claim 1, wherein the meridian altitude angle control frame includes:
 an altitude actuator including: a worm gear engaged with a worm formed on the central shaft, rotating 360°/365 per a daily altitude angle tracking rotation amount of the worm in the casing, combined with a one-directional clutch to rotate in only one direction; a vertical moving rod disposed opposite to the first azimuth rotary shaft from the central shaft of the casing and coupled to the casing to vertically move; and a connecting rod crank connecting the worm gear and the vertical moving rod to each other;

a first altitude link arm having a first end linked to the central shaft of the casing to form a first fixed link and a second end having a second altitude link joint;

a second altitude link arm having a first end linked to the second altitude link joint and a second end having the rotary shaft housing; and an altitude actuating arm including: a main arm having a first end linked between the central shaft and the vertical moving rod of the casing to form a second fixed link and a second end linked to a body of the second altitude link arm to form a third altitude link joint; and an assistant arm extending and bent toward the vertical moving rod from the second fixed link of the main arm and linked to an end of the vertical moving rod to form an actuating link joint, wherein the worm gear vertically reciprocates the vertical moving rod one cycle in a year while rotating one round in a year, thereby changing an inclination angle of the rotary shaft housing to follow the variable meridian altitude of the sun.

3. The apparatus of claim 1, wherein the second azimuth link arm includes an assistant link arm extending in the same direction as the second azimuth rotary shaft, and the second azimuth link joint is formed by coupling an end of the assistant link arm to the second yoke-shaped link coupler.

4. The apparatus of claim 1, further comprising:

a rotary arm coupled to the first end of the central shaft; and a rotary arm actuator for the rotary arm, wherein the rotary arm is controlled by the rotary arm actuator such that the second azimuth link arm rotates to follow the sun in the daytime, and is further controlled to return in the night time to prepare for tracking the sun for next day.

5. The apparatus of claim 4, further comprising a power transmission shaft linked to the rotary arm between the rotary arm and the rotary arm actuator, wherein the rotary arm actuator moves the power transmission shaft in a linear direction such that the central shaft is rotated by a crank motion of the power transmission shaft and the rotary arm.

6. The apparatus of claim 5, wherein a plurality of the apparatuses are arranged in a line along the power transmission shaft and the rotary arms are connected to simultaneously operate the apparatuses.

* * * * *